US011641352B2

(12) United States Patent
Li

(10) Patent No.: US 11,641,352 B2
(45) Date of Patent: May 2, 2023

(54) APPARATUS, METHOD AND COMPUTER PROGRAM PRODUCT FOR BIOMETRIC RECOGNITION

(71) Applicant: Nokia Technologies Oy, Espoo (FI)

(72) Inventor: Yazhao Li, Tianjin (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 452 days.

(21) Appl. No.: 16/645,000

(22) PCT Filed: Sep. 21, 2017

(86) PCT No.: PCT/CN2017/102680
§ 371 (c)(1),
(2) Date: Mar. 6, 2020

(87) PCT Pub. No.: WO2019/056257
PCT Pub. Date: Mar. 28, 2019

(65) Prior Publication Data
US 2020/0204546 A1 Jun. 25, 2020

(51) Int. Cl.
*G06K 9/20* (2006.01)
*H04L 9/40* (2022.01)
(Continued)

(52) U.S. Cl.
CPC ....... *H04L 63/0861* (2013.01); *G06N 3/0454* (2013.01); *G06N 3/08* (2013.01); *G06V 40/15* (2022.01)

(58) Field of Classification Search
CPC ................... G06V 40/15; G06V 10/82; G06V 40/40–40/70; G06N 3/0454;
(Continued)

(56) References Cited

U.S. PATENT DOCUMENTS

2006/0215883 A1 9/2006 Kim et al.
2016/0148488 A1 5/2016 Tijerina et al.
(Continued)

FOREIGN PATENT DOCUMENTS

CN 103944615 A 7/2014
CN 104077516 A 10/2014
(Continued)

OTHER PUBLICATIONS

Israel et al., "ECG to Identify individuals", Pattern Recognition, vol. 38, No. 1, Jan. 2005, pp. 133-142.
(Continued)

*Primary Examiner* — Brian Werner
(74) *Attorney, Agent, or Firm* — Alston & Bird LLP

(57) ABSTRACT

Method, apparatus, computer program product and computer readable medium are disclosed for biometric recognition. The method may comprise obtaining first biometric data, wherein the first biometric data is captured in first condition or non-first condition; determining, by a discriminative network of generative adversarial networks, whether the first biometric data is captured in the first condition or non-first condition; in response to a determination that the first biometric data is captured in the non-first condition, inputting the first biometric data to a generative network of the generative adversarial networks to generate a second biometric data; obtaining a matching result by inputting the first biometric data in response to a determination that the first biometric data is captured in the first condition or the second biometric data to a matching network; and determining a recognition result based on the matching result.

9 Claims, 5 Drawing Sheets

(51) Int. Cl.
G06N 3/04 (2023.01)
G06N 3/08 (2023.01)
G06V 40/10 (2022.01)

(58) Field of Classification Search
CPC .......... G06N 20/00–20/20; G06N 3/02–3/105;
G06T 2207/20081; G06T 2207/20084;
G06T 3/4046; G06T 9/002
See application file for complete search history.

(56) References Cited

U.S. PATENT DOCUMENTS

| | | |
|---|---|---|
| 2017/0035327 A1 | 2/2017 | Yuen et al. |
| 2017/0039358 A1 | 2/2017 | Yuen et al. |
| 2017/0188971 A1 | 7/2017 | Liu et al. |
| 2018/0268055 A1* | 9/2018 | Yu ........................ G06V 40/166 |

FOREIGN PATENT DOCUMENTS

| | | |
|---|---|---|
| CN | 105072252 A | 11/2015 |
| CN | 105549745 A | 5/2016 |
| CN | 106803082 A | 6/2017 |
| CN | 107038840 A | 8/2017 |
| WO | 2013/109154 A1 | 7/2013 |

OTHER PUBLICATIONS

Kim et al., "A Robust Human Identification by Normalized Time-Domain Features of Electrocardiogram", IEEE Engineering in Medicine and Biology 27th Annual Conference, Jan. 17-18, 2006, pp. 1114-1117.
Shen et al., "Implementation of a One-Lead ECG Human Identification System on a Normal Population", Journal of Engineering and Computer Innovations, vol. 2, No. 1, Jan. 2011, pp. 12-21.
Singh et al., "Evaluation of Electrocardiogram for Biometric Authentication", Journal of Information Security, vol. 3, No. 1, 2012, pp. 39-48.
Tawfik et al., "Human Identification Using QT Signal and QRS Complex of the ECG", i he Online Journal on Electronics and Electrical Engineering (OJEEE), vol. 3, No. 1, 2011, pp. 383-387.
Sagie et al., "An Improved Method for Adjusting the QT Interval for Heart Rate (The Framingham Heart Study)", The American Journal of Cardiology, vol. 70, No. 7, Sep. 15, 1992, pp. 797-801.
Fatemian et al., "A New ECG Feature Extractor for Biometric Recognition", 16th International Conference on Digital Signal Processing, Jul. 5-7, 2009, 6 pages.
Odinaka et al., "ECG Biometric Recognition: A Comparative Analysis", IEEE Transactions on Information Forensics and Security, vol. 7, No. 6, Dec. 2012, pp. 1812-1824.
Wu et al., "ECG Identification based on Neural Networks", 11th International Computer Conference on Wavelet Actiev Media Technology and information Processing(ICCWAMTIP), Dec. 19-21, 2014, pp. 92-96.
Mai et al., "ECG Biometric using Multilayer Perceptron and Radial Basis Function Neural Networks", Annual International Conference of the IEEE Engineering in Medicine and Biology Society, Aug. 30-Sep. 3, 2011, pp. 2745-2748.
Zhang et al., "A Multiresolution Convolutional Neural Network for ECG-based Biometric Human Identification in Smart Health Applications", IEEE Access, vol. 5, May 24, 2017, pp. 11805-11816.
Wan et al., "A Neural Network to Identify Human Subjects with Electrocardiogram Signals", Proceedings of the World Congress on Engineering and Computer Science, Oct. 22-24, 2008, 4 pages.
Tseng et al., "ECG Identification System Using Neural Network with Global and Local Features", International Conferences ITS, ICEduTech and STE, 2016, pp. 3-10.
Bassiouni et al., "A Machine Learning Technique for Person Identification Using ECG Signals", international Journal of Applied Physics, vol. 1, 2016, pp. 37-41.
Belgacem et al., "ECG Based Human Authentication Using Wavelets and Random Forests", International Journal on Cryptography and Information Security (IJCIS),vol. 2, No. 2, Jun. 2012, pp. 1-11.
Zheng et al., "Unlabeled Samples Generated by GAN Improve the Person Re-identification Baseline in Vitro", IEEE International Conference on Computer Vision (ICCV), Oct. 22-29, 2017, pp. 3774-3782.
Goodfellow et al., "Generative Adversarial Networks", Advances in neural information processing systems, 2014, 9 pages.
International Search Report and Written Opinion received for corresponding Patent Cooperation Treaty Application No. PCT/CN2017/102680, dated Jun. 20, 2018, 10 pages.
Office action received for corresponding Indian Patent Application No. 202047007130, dated Jul. 1, 2021, 6 pages.
Extended European Search Report received for corresponding European Patent Application No. 17925849.6, dated Mar. 12, 2021, 4 pages.
Tran et al., "Disentangled Representation Learning GAN for Pose-Invariant Face Recognition", IEEE Conference On Computer Vision And Pattern Recognition (CVPR 2017), Jul. 21, 2017, pp. 1415-1424.
Komeili et al., "On evaluating human recognition using electrocardiogram signals: From rest to exercise",2016 IEEE Canadian Conference on Electrical and Computer Engineering (CCECE), May 15, 2016, 4 pages.
Office action received for corresponding European Patent Application No. 17925849.6, dated Mar. 24, 2021, 9 pages of office action.
Office Action for Chinese Application No. 201780095021.8 dated Dec. 26, 2022, 10 pages.
Komeili et al., "On Evaluating Human Recognition Using Electrocardiogram Signals: From Rest to Exercise", 2016 IEEE Canadian Conference on Electrical and Computer Engineering (CCECE), (May 15-18, 2016), 4 pages.

* cited by examiner

APPARATUS, METHOD AND COMPUTER PROGRAM PRODUCT FOR BIOMETRIC RECOGNITION

RELATED APPLICATION

This application claims priority to PCT Application No. PCT/CN2017/102680, filed on Sep. 21, 2017, which is incorporated herein by reference in its entirety.

FIELD OF THE INVENTION

Embodiments of the disclosure generally relate to information technologies, and, more particularly, to biometric recognition.

BACKGROUND

Biometric recognition, the automated recognition of individuals based on their behavioral and biological characteristic, is promoted as a way to provide human identification, provide better control of access to physical facilities and financial accounts, and increase the efficiency of access to services and their utilization. Biometric recognition has been applied to human identification, patient tracking in medical informatics, and the personalization of social services, attendance system, possession management, safety supervision, vehicle driver detection, among other things. For example, a vehicle driver detection system may be implemented by using biometric recognition technology. In the vehicle driver detection system, the biometric data for a person may be captured by a sensor and the system may determine whether the identity of the person matches with a registered user in the system. If the person is a registered user, the system may give permission. Otherwise the system may give rejection and warning. However the identification performance may degrade for some biometric data. Therefore an improved solution for biometric recognition is desirable.

SUMMARY

As a general mechanism for human identification via biometric data such as electrocardiogram (ECG) biometrics, template matching has been widely explored. However the identification performance of most existing biometric recognition methods degrades because of the variations of biometric data. For example, for a specific user, the heart activities which are reflected by ECG signals may be varied in different physical states such as before, during or after exercise and mental states such as relax or stress. However, almost the existing biometric recognition methods neglect the variations of ECG data in different states and periods of long term. Although some methods take the variations of heart rate (HR) into consideration, they pay little attention to various ECG waves. Moreover, traditional manual features for ECG biometrics are shallow and coarse. With these features, the ECG signals from different users are not separable sometimes. That is, manual features based methods can't guarantee the optimality and generalization. The identification performance also degrades. Therefore an improved solution for biometric recognition is desirable.

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to another aspect of the present disclosure, it is provided a method. The method may comprise obtaining first biometric data, wherein the first biometric data is captured in first condition or non-first condition; determining, by a discriminative network of generative adversarial networks, whether the first biometric data is captured in the first condition or non-first condition; in response to a determination that the first biometric data is captured in the non-first condition, inputting the first biometric data to a generative network of the generative adversarial networks to generate a second biometric data; obtaining a matching result by inputting the first biometric data in response to a determination that the first biometric data is captured in the first condition or the second biometric data to a matching network; and determining a recognition result based on the matching result.

According to one aspect of the disclosure, it is provided an apparatus. The apparatus may comprise at least one processor; and at least one memory including computer program code, the memory and the computer program code configured to, working with the at least one processor, cause the apparatus to obtain first biometric data, wherein the first biometric data is captured in first condition or non-first condition; determine, by a discriminative network of generative adversarial networks, whether the first biometric data is captured in the first condition or non-first condition; in response to a determination that the first biometric data is captured in the non-first condition, input the first biometric data to a generative network of the generative adversarial networks to generate a second biometric data; obtain a matching result by inputting the first biometric data in response to a determination that the first biometric data is captured in the first condition or the second biometric data to a matching network; and determine a recognition result based on the matching result.

According to still another aspect of the present disclosure, it is provided a computer program product embodied on a distribution medium readable by a computer and comprising program instructions which, when loaded into a computer, causes a processor to obtain first biometric data, wherein the first biometric data is captured in first condition or non-first condition; determine, by a discriminative network of generative adversarial networks, whether the first biometric data is captured in the first condition or non-first condition; in response to a determination that the first biometric data is captured in the non-first condition, input the first biometric data to a generative network of the generative adversarial networks to generate a second biometric data; obtain a matching result by inputting the first biometric data in response to a determination that the first biometric data is captured in the first condition or the second biometric data to a matching network; and determine a recognition result based on the matching result.

According to still another aspect of the present disclosure, it is provided a non-transitory computer readable medium having encoded thereon statements and instructions to cause a processor to obtain first biometric data, wherein the first biometric data is captured in first condition or non-first condition; determine, by a discriminative network of generative adversarial networks, whether the first biometric data is captured in the first condition or non-first condition; in response to a determination that the first biometric data is captured in the non-first condition, input the first biometric data to a generative network of the generative adversarial networks to generate a second biometric data; obtain a matching result by inputting the first biometric data in response to a determination that the first biometric data is captured in the first condition or the second biometric data to a matching network; and determine a recognition result based on the matching result.

According to still another aspect of the present disclosure, it is provided an apparatus comprising means configured to obtain first biometric data, wherein the first biometric data is captured in first condition or non-first condition; means configured to determine, by a discriminative network of generative adversarial networks, whether the first biometric data is captured in the first condition or non-first condition; in response to a determination that the first biometric data is captured in the non-first condition, means configured to input the first biometric data to a generative network of the generative adversarial networks to generate a second biometric data; means configured to obtain a matching result by inputting the first biometric data in response to a determination that the first biometric data is captured in the first condition or the second biometric data to a matching network; and means configured to determine a recognition result based on the matching result.

These and other objects, features and advantages of the disclosure will become apparent from the following detailed description of illustrative embodiments thereof, which is to be read in connection with the accompanying drawings.

DETAILED DESCRIPTION

Figure 1:
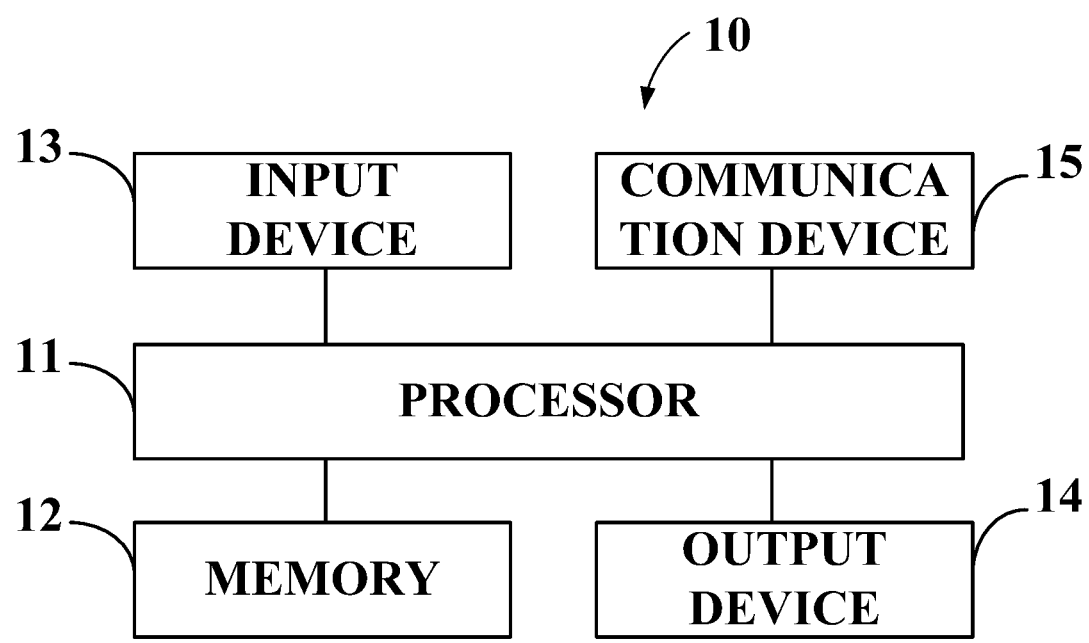
FIG. 1 is a simplified block diagram showing an apparatus according to an embodiment.

For the purpose of explanation, details are set forth in the following description in order to provide a thorough understanding of the embodiments disclosed. It is apparent, however, to those skilled in the art that the embodiments may be implemented without these specific details or with an equivalent arrangement. Various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

It is noted that though the embodiments are mainly described in the context of biometric recognition for ECG data, they are not limited to this but can be applied to biometric recognition for any suitable biometric data. Moreover, the embodiments can be applied to any application associated with biometric recognition, such as human identification in various tasks for example group or individual health care, attendance system, possession management, safety supervision and so on.

Human identification by the uniqueness of an individual is an indispensable part of human life. In the last decades, a new human identification technique by biometric recognition via ECG has been proposed and studied. Due to differences in position, size and anatomy of the heart, age, sex, and various factors from different people, the ECG signals have different characteristics and vary from person to person. Different from other biometrics, liveness check is the premise of ECG capturing and ECG identification. Because of the uniqueness and liveness, it is difficult to forge the ECG signals. In addition, precise sensors for ECG signals capturing are widely used in popular wearable devices such as watches and bracelets nowadays. In short, due to the uniqueness, universality for human, convenience for collecting, conciseness and unforgeability, biometric recognition via ECG provides a high level security and convenience, embedding the ECG recognition system into wearable devices can be an alternative for other biometrics in practice.

As mentioned above, the identification performance of most existing biometric recognition methods degrades because of the variations of ECG data. There are some methods attempting to normalize ECG signals with heart rate (HR) changes. However, the HR changes are not all the changes of ECG signal waves. Most existing methods neglect the uneven changes of QRS complexes amplitudes in different situations, which cause that the identification performance degrades, wherein the QRS complex is a name for the combination of three of the graphical deflections seen on a typical ECG. In addition, the manual designed modification to the ECG waves isn't suitable to all users. Learning the complex mapping relationship to modify the ECG waves may be required for human identification via ECG biometrics.

There are some other biometric recognition approaches using learning methods based on neural networks for human identification. These approaches adopt a multi-classification mechanism which can't be generalized. For example, when group members are changed (for example, only one new member in or one member out), the fixed identification model has to be re-trained, which is time consuming and complex.

To overcome or mitigate at least one of the above-mentioned problems or other problems, the embodiments of the disclosure propose a solution for biometric recognition by generative adversarial networks (GAN) and a matching network. The proposed solution comprises a training stage and an applying stage. The goal of the training stage is to learn the parameters of the GAN and the matching network. With the trained GAN and the trained matching network, the applying stage is used for discriminating the condition of the biometric data such as heartbeat, getting the first condition biometric data such as rest-conditional heartbeats, calculating the template matching results, and finishing the final identification.

In generally, GAN contains two networks: one is called as a generative network (G) and the other one is called as a discriminative network (D). G captures the data distribution, and D estimates the probability that a sample came from the training data rather than G. The training procedure for G is to maximize the probability of D making a mistake.

For example, G may be used for generating a new heartbeat from the non-first conditional biometric data such as a motion-conditional ECG heartbeat. D learns to determine whether a sample is from the rest condition or motion condition. The generated heartbeat should be so similar to the rest-conditional heartbeat that D determines the generated heartbeat is from the rest condition. That is, G and D are adversarial to find a balance when G has learned how to generate heartbeats which have similar features and distribution with rest-conditional heartbeats.

The GAN used in this disclosure may share the similar training procedure with the typical GAN as described in I. Goodfellow, J. Pougetabadie, M. Mirza, et al., "Generative Adversarial Networks", Advances in Neural Information Processing Systems, 2014, 3:2672-2680, the disclosure of which is incorporated by reference herein in their entirety. After training, the mapping from the non-first conditional biometric data such as motion condition to the first conditional biometric data such as the rest condition is learned by G. And then the trained G is used to modify the non-first conditional biometric data, and the network D can help to discriminate the conditions of the current biometric data.

In addition, a template matching mechanism is used to guarantee the generalization ability of the identification system. The template matching mechanism can be based on traditional template matching method or convolutional neural networks (CNN). For example, CNN may be used for learning features and calculating the matching results (match or non-match) to finish the identification. That is, the criterion for benchmarking the similarity between the input template and verified heartbeat can be directly learned by the CNN. Even if there are some changes about the group members, the identification models needn't to be re-trained, which is more generic and effective compared to the multi-classification mechanism.

The architecture of CNN may for example depend on the input biometric data. For example, ECG has one dimensional input data, so the CNN for ECG may be seen as one-dimensional (1-D) CNN. The convolutional kernels in 1-D CNN have the window size as h×1 instead of h×w in traditional CNN, wherein h and w are integers. Several convolutional layers followed by non-linear function and several pooling layers are stacked to generate the networks.

For GAN and the matching network, different deep architectures may be selected to get the optimal performance. For example, there may be not pooling layers in the architecture of the generative network if the input and output of the generative network are same. For the first layer of the matching network for ECG data, the spatial size of convolutional filters may be h×2.

FIG. 1 is a simplified block diagram showing an apparatus, such as an electronic apparatus 10, in which various embodiments of the disclosure may be applied. It should be understood, however, that the electronic apparatus as illustrated and hereinafter described is merely illustrative of an apparatus that could benefit from embodiments of the disclosure and, therefore, should not be taken to limit the scope of the disclosure. While the electronic apparatus 10 is illustrated and will be hereinafter described for purposes of example, other types of apparatuses may readily employ embodiments of the disclosure. The electronic apparatus 10 may be a user equipment, a mobile computer, a desktop computer, a laptop computer, a mobile phone, a smart phone, a tablet, a server, a cloud computer, a virtual server, a computing device, a distributed system, a video surveillance apparatus, and/or any other types of electronic systems. The electronic apparatus 10 may run with any kind of operating system including, but not limited to, Windows, Linux, UNIX, Android, iOS and their variants. Moreover, the apparatus of at least one example embodiment need not to be the entire electronic apparatus, but may be a component or group of components of the electronic apparatus in other example embodiments.

In an embodiment, the electronic apparatus 10 may comprise processor 11 and memory 12. Processor 11 may be any type of processor, controller, embedded controller, processor core, graphics processing unit (GPU) and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), and/or the like.

Processor 11 may comprise means, such as circuitry, for implementing audio, video, communication, navigation, logic functions, and/or the like, as well as for implementing embodiments of the disclosure including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 11 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output Device 14 may comprise a visual output device, such as a display, a light, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, a removable storage device and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

Input device 13 may comprise a biometric data capturing element. The biometric data capturing element may be any means for capturing the biometric data such as ECG for storage, display or transmission. For example, in at least one example embodiment, the biometric data capturing element is an ECG sensor. As such, the biometric data capturing element may comprise hardware and/or software necessary for capturing the biometric data. In addition, input device 13 may comprise any other elements such as a camera module.

Figure 2:
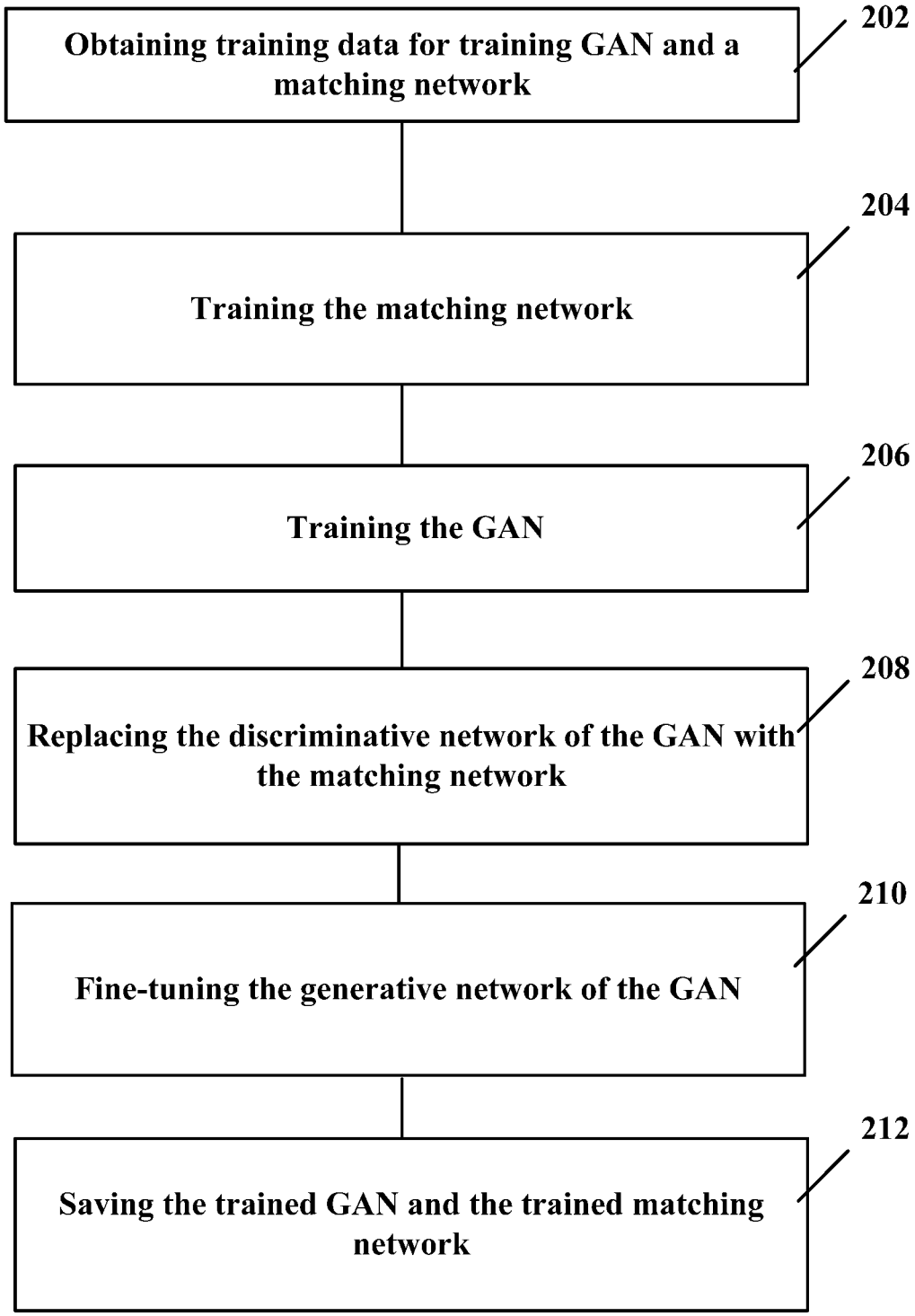
FIG. 2 is a flow chart depicting a process of a training stage of biometric recognition according to an embodiment of the present disclosure.

FIG. 2 is a flow chart depicting a process 200 of a training stage of biometric recognition according to an embodiment of the present disclosure, which may be performed at an apparatus such as the electronic apparatus 10 of FIG. 1. As such, the electronic apparatus 10 may provide means for accomplishing various parts of the process 200 as well as means for accomplishing other processes in conjunction with other components.

As shown in FIG. 2, the process 200 may start at block 202 where training data is obtained for training the GAN and the matching network. The GAN and the matching network can be any suitable existing or future developed GAN and matching networks, and the disclosure has no limit on it. For example, the matching network can be a convolutional neural network or a deep convolutional neural network.

As described above, the biometrics data for a user may be varied in different conditions such as different physical states (before, during or after exercise) and mental states (relax or stress). In general, the different conditions can be categorized as two conditions, wherein one condition may be called as a first condition and the other one may be called as a non-first condition, wherein which condition is selected as the first condition may depend on for example the characteristics of the biometrics data captured in different conditions or as a matter of experience. For example, for ECG heartbeats, the rest or relax condition may be selected as the first condition, and the other condition such as motion or stress condition may be selected as the non-first condition.

The training data may comprise different datasets. For example, for training GAN, dataset 1 may comprise a large number of ECG heartbeats and labels, wherein the ECG heartbeats are captured in two different conditions. One part is the rest-conditional data and the other is the motion-conditional data. A label indicates that an ECG heartbeat is either from rest condition or motion condition. For dataset 2 training the matching network, the templates of users for the training stage is extracted from the rest-conditional heartbeats. The heartbeats in the rest-condition and the templates are combined to $(y_j, T) \in \mathbb{R}^{L \times 2}$ with their labels to generate dataset 2. For dataset 2, a label indicates that a heartbeat matches a template or not. Dataset 3 for fine-tuning the generative network G may be generated by combining the templates with the heartbeats in motion condition.

The templates of users may be extracted from the rest-conditional heartbeats by any suitable ways. For example, suppose the fixed size of a heartbeat is L×1, wherein L denotes the number of sample points, the template $(T \in \mathbb{R}^{L \times 1})$ of a user may be generated by calculating the mean of n successive rest-conditional heartbeats $x_i \in \mathbb{R}^{L \times}$, i=1, 2, . . . , n, $$T = (x_1 + x_2 + \ldots + x_n)/n \quad (1)$$

Then, $(x_i, T) \in \mathbb{R}^{L \times 2}$ is generated as an input positive sample with label '1' (match) of the matching network M. Suppose $y_j$ represents a heartbeat from another user, then $(y_j, T) \in \mathbb{R}^{L \times 2}$ is generated as an input negative sample with label '−1' (non-match). Therefore, the template matching can be seen as a binary classification task. Many positive samples and negative samples are generated and used for training network M. With Backward Propagation (BP) algorithm and Stochastic Gradient Descent (SGD) algorithm, the parameters of M are updated iteratively.

At block 204, the first biometric data of at least one user captured in the first condition is used for training the matching network. For example, dataset 2 generated in block 202 may be used for training the matching network M. The standard forward propagation is performed by executing the convolution, activation and pooling operations. Then backward propagation for calculating the gradients of parameters are performed for training the matching network M. The parameters of convolutional layers are updated by SGD method. The matching network M is trained iteratively until it is convergent.

At block 206, the first biometric data of at least one user captured in the first condition and the first biometric data of at least one user captured in the non-first condition are used for training the GAN. For example, dataset 1 generated in block 202 may be used for training the GAN. The rest-conditional heartbeats are used for training generative network G and all the heartbeats are used for training the discriminative network D. Network G and network D for ECG may be trained iteratively by the similar adversarial training mechanism to standard GAN. The training process for GAN may be stopped until the discrimination error rate by network D is convergent to about 50%.

At block 208, the discriminative network is replaced with the matching network.

At block 210, the generative network is fine-tuned by using the first biometric data of at least one user captured in the non-first condition. The matching network M is fixed without updating. For example, dataset 3 generated on block 202 may be used for fine-tuning generative network G. That is, if the current sample $(\tilde{x}_i, T)$ where $\tilde{x}_i$ is generated by the network G is wrongly recognized by the matching network M, network G is updated by the BP algorithm and SGD algorithm. The fine-tuning is finished until the matching error rate is convergent.

At block 212, the trained generative network G, discriminative network D and matching network M are saved for use in the applying stage of biometric recognition.

Figure 3:
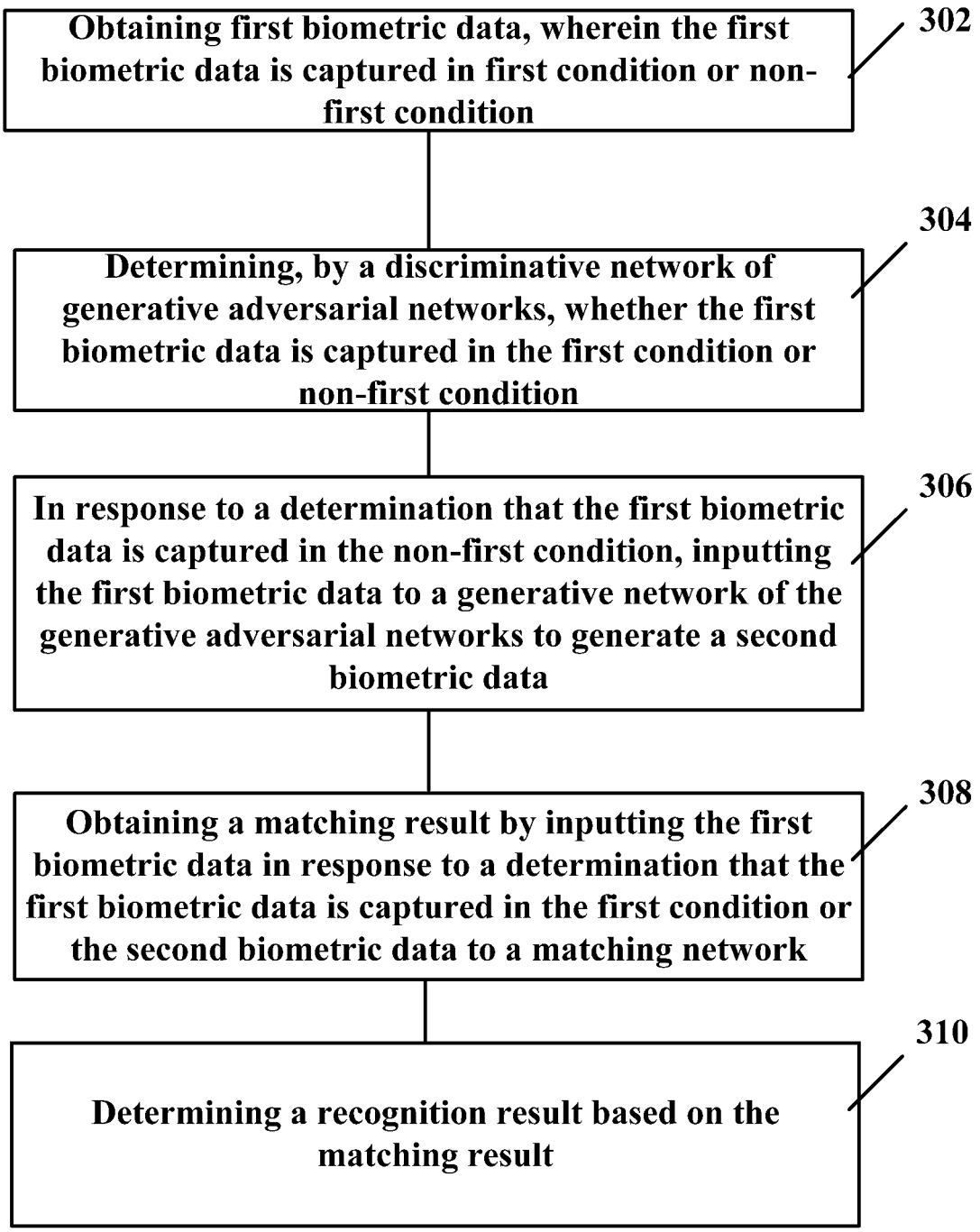
FIG. 3 is a flow chart depicting a process of an applying stage of biometric recognition according to embodiments of the present disclosure.

FIG. 3 is a flow chart depicting a process 300 of the applying stage of biometric recognition according to embodiments of the present disclosure, which may be performed at an apparatus such as the electronic apparatus 10 of FIG. 1. As such, the electronic apparatus 10 may provide means for accomplishing various parts of the process 300 as well as means for accomplishing other processes in conjunction with other components.

As shown in FIG. 3, the process 300 may start at block 302 where the electronic apparatus 10 obtains first biometric data, wherein the first biometric data is captured in the first condition or the non-first condition. The electronic apparatus 10 may obtain the first biometric data from wearable devices such as watches and bracelets or from the input device of the electronic apparatus 10. As mentioned above, for ECG data, the first condition may be rest condition or relax condition and the non-first condition may be motion condition or stress condition. For other biometric data, the first condition and the non-first condition may be determined similarly or differently.

At block 304, the electronic apparatus 10 determines, by a discriminative network of the GAN, whether the first biometric data is captured in the first condition or non-first condition. For example, when the first biometric data is captured in the first condition, the discriminative network may determine that the first biometric data is captured in the first condition. When the first biometric data is captured in the non-first condition, the discriminative network may determine that the first biometric data is captured in the non-first condition.

At block 306, in response to a determination that the first biometric data is captured in the non-first condition, the first biometric data is inputted to a generative network of the GAN to generate a second biometric data. For example, for ECG data, a motion-conditional heartbeat is input to the generative network of the GAN to generate a rest-conditional heartbeat.

At block 308, the electronic apparatus 10 obtains a matching result by inputting the first biometric data in response to a determination that the first biometric data is captured in the first condition or the second biometric data to the matching network. As mentioned above, the matching network can be a convolutional neural network or a deep convolutional neural network. For example, when the determination indicates that the first biometric data is captured in the first condition such as rest condition, the first biometric data is input directly to the matching network. Otherwise, the second biometric data from the generative network of the GAN is input to the matching network.

At block 310, the electronic apparatus 10 may determine a recognition result based on the matching result. For example, the matching result may be a matching probability. If the matching probability is less than or equal to a threshold e (e.g., 0.5), the current user is identified as an impostor. The electronic apparatus 10 may give rejection and warning. If the matching probability is larger than e, the electronic apparatus 10 may give permission. Then, the user whose template gets the max probability matching with the current user's heartbeat is identified as the user's identity. It is noted that the threshold may be determined based on any suitable ways or it may be configured as a matter of experience.

Figure 4:
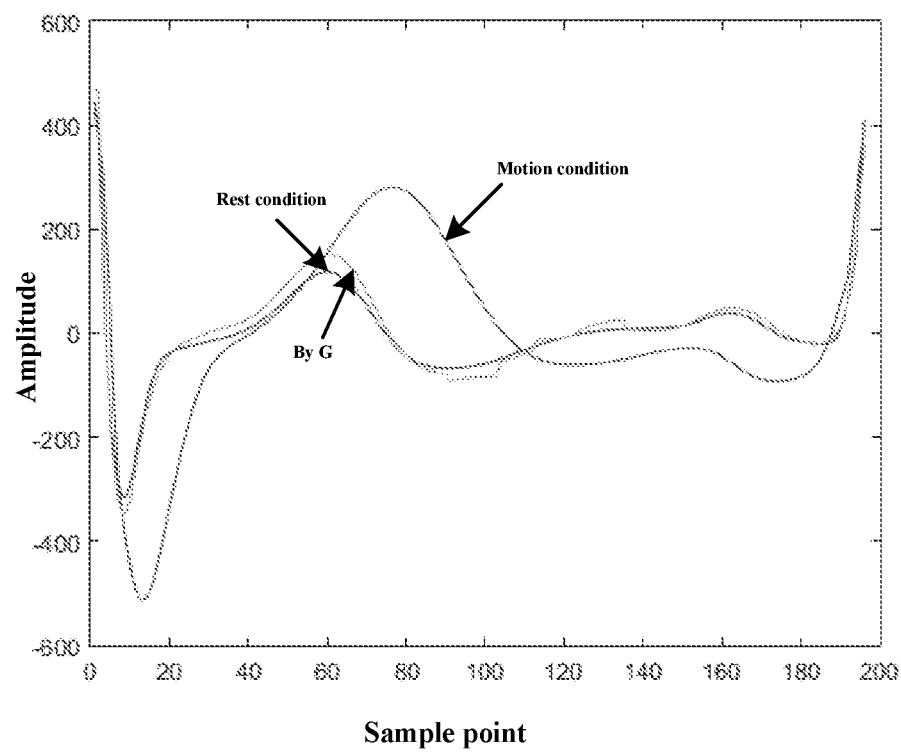
FIG. 4 shows a result of a method according to an embodiment.

FIG. 4 shows a result of a method according to an embodiment. A rest-conditional heartbeat wave and a motion-conditional heartbeat wave from the same user are shown in FIG. 4. The heartbeat wave generated by the motion-conditional heartbeat through the generative network G is also shown. It is apparent that comparing to the motion-conditional heartbeat, the new generated heartbeat is more similar to the rest-conditional heartbeat. It is effective to modify the motion conditional ECG heartbeats by the proposed method.

Figure 5:
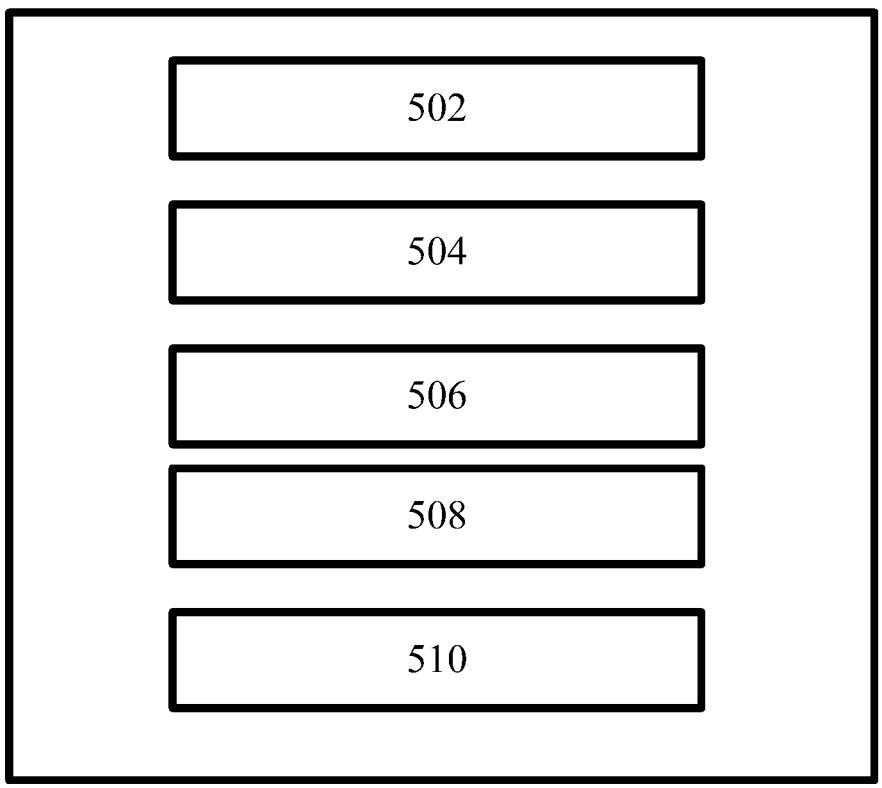
FIG. 5 is a simplified block diagram showing an apparatus according to an embodiment.

FIG. 5 is a simplified block diagram showing an apparatus according to an embodiment. For same parts as in the previous embodiments, the description thereof may be omitted as appropriate. The apparatus may comprise means configured to carry out the processes described above. In an embodiment, the apparatus comprises means 502 configured to obtain first biometric data, wherein the first biometric data is captured in first condition or non-first condition; means 504 configured to determine, by a discriminative network of generative adversarial networks, whether the first biometric data is captured in the first condition or non-first condition; in response to a determination that the first biometric data is captured in the non-first condition, means 506 configured to input the first biometric data to a generative network of the generative adversarial networks to generate a second biometric data; means 508 configured to obtain a matching result by inputting the first biometric data in response to a determination that the first biometric data is captured in the first condition or the second biometric data to a matching network; and means 510 configured to determine a recognition result based on the matching result.

In an embodiment, the apparatus may further comprise means (not shown) configured to train the matching network by using the first biometric data of at least one user captured in the first condition; and means (not shown) configured to train the generative adversarial networks by using the first biometric data of at least one user captured in the first condition and the first biometric data of at least one user captured in the non-first condition.

In an embodiment, the apparatus may further comprise means (not shown) configured to replace the discriminative network with the matching network; and means (not shown) configured to fine-tune the generative network by using the first biometric data of at least one user captured in the non-first condition.

In an embodiment, the first biometric data is electrocardiogram data.

In an embodiment, the first condition is rest/relax condition.

In an embodiment, the matching network is convolutional neural networks.

The above embodiments can be used in various situations for human identification. For a safety supervision system, especially with high level security, recognizing the impostor and avoiding the property damage are necessary. As described above, ECG biometrics have a lot of advantages such as liveness check and unforgeable signals. So equipping the sensors for ECG signals acquisition and embedding the identification method as described above in the computation devices provide a safety supervision system with high level security. The ECG sensor is used for capturing the ECG signals from a user to get more than one heartbeat. The computation device may have stored the templates registered by many users. Then the ECG signals are input to the safety supervision system to get the final identification results. If one registered user needs to be identified, this system outputs the identity of the current user and gives permission. If an impostor who hasn't registered in this system, the rejection order are output by recognizing the current user as an impostor and maybe warning is triggered by the insecure impostor.

The embodiments of the disclosure may have the following advantages:

(1) With the adversarial learning mechanism, the GAN is effective for modifying the disturbance and variations on biometric data such as ECG heartbeat wave caused by different conditions such as stress and/or exercise. The complex mapping relationship can be directly learned by the GAN.

(2) The CNN method based on template matching mechanism is more generic and superior than the traditional matching methods. CNN help learning hierarchical features instead of calculating manual designed features from the ECG signals, which is essential for human identification. In addition, when there are some changes about members in the current communities, only registering more templates or removing the invalid templates without re-training process is needed, which is feasible in practice.

(3) The embodiments can improve the performance of human identification as well as the security of applications associated with the human identification. For example, in the vehicle driver detection system, the performance of human identification is higher, the probability that a person is correctly identified will be greater, i.e., the security of the system will be higher.

It is noted that any of the components of the apparatus described above can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

Additionally, an aspect of the disclosure can make use of software running on a general purpose computer or workstation. Such an implementation might employ, for example, a processor, a memory, and an input/output interface formed, for example, by a display and a keyboard. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. The processor, memory, and input/output interface such as display and keyboard can be interconnected, for example, via bus as part of a data processing unit. Suitable interconnections, for example via bus, can also be provided to a network interface, such as a network card, which can be provided to interface with a computer network, and to a media interface, such as a diskette or CD-ROM drive, which can be provided to interface with media.

Accordingly, computer software including instructions or code for performing the methodologies of the disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

As noted, aspects of the disclosure may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the disclosure may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

The flowchart and block diagrams in the figures illustrate the architecture, functionality, and operation of possible implementations of apparatus, methods and computer program products according to various embodiments of the disclosure. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

In any case, it should be understood that the components illustrated in this disclosure may be implemented in various forms of hardware, software, or combinations thereof, for example, application specific integrated circuit(s) (ASICS), a functional circuitry, a graphics processing unit, an appropriately programmed general purpose digital computer with associated memory, and the like. Given the teachings of the disclosure provided herein, one of ordinary skill in the related art will be able to contemplate other implementations of the components of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method comprising:
   obtaining first electrocardiogram data, wherein the first electrocardiogram data is captured in a rest or relax condition or a motion or stress condition;
   determining, by a discriminative network of generative adversarial networks, whether the first electrocardiogram data is captured in the rest or relax condition or the motion or stress condition;
   generating, in response to a determination that the first electrocardiogram data is captured in the motion or stress condition, second electrocardiogram data by inputting the first electrocardiogram data to a generative network of the generative adversarial networks;
   obtaining a matching result by inputting tithe first electrocardiogram data in response to a determination that the first electrocardiogram data is captured in the rest or relax condition, or iii) the second electrocardiogram data, in response to a determination that the first electrocardiogram data is captured in the motion or stress condition, to a matching network; and
   determining a recognition result based on the matching result.

2. The method according to claim 1, further comprising:
   training the matching network by using the first electrocardiogram data of at least one user captured in the rest or relax condition; and
   training the generative adversarial networks by using the first electrocardiogram data of at least one user captured in the rest or relax condition and the first electrocardiogram data of at least one user captured in the motion or stress condition.

3. The method according to claim 2, further comprising:
replacing the discriminative network with the matching network; and
fine-tuning the generative network by using the first electrocardiogram data of at least one user captured in the motion or stress condition.

4. The method according to claim 1, wherein the matching network is a convolutional neural network.

5. An apparatus, comprising:
at least one processor; and
at least one memory including computer program code, the memory and the computer program code configured to, working with the at least one processor, cause the apparatus to;
obtain first electrocardiogram data, wherein the first electrocardiogram data is captured in a rest or relax condition or a motion or stress condition;
determine, by a discriminative network of generative adversarial networks, whether the first electrocardiogram data is captured in the rest or relax condition or the motion or stress condition;
generate, in response to a determination that the first electrocardiogram data is captured in the motion or stress condition, second electrocardiogram data by inputting the first electrocardiogram data to a generative network of the generative adversarial networks;
obtain a matching result by inputting tithe first electrocardiogram data, in response to a determination that the first electrocardiogram data is captured in the rest or relax condition, or iii) the second electrocardiogram data, in response to a determination that the first electrocardiogram data is captured in the motion or stress condition, to a matching network; and
determine a recognition result based on the matching result.

6. The apparatus according to claim 5, wherein the memory and the computer program code are further configured to, with the at least one processor, cause the apparatus to:
train the matching network by using the first electrocardiogram data of at least one user captured in the rest or relax condition; and
fine-tune the generative adversarial networks by using the first electrocardiogram data of at least one user captured in the rest or relax condition and the first electrocardiogram data of at least one user captured in the motion or stress condition.

7. The apparatus according to claim 6, wherein the memory and the computer program code are further configured to, with the at least one processor, cause the apparatus to:
replace the discriminative network with the matching network; and
train the generative network by using the first electrocardiogram data of at least one user captured in the motion or stress condition.

8. The apparatus according to claim 5, wherein the matching network is a convolutional neural network.

9. A non-transitory computer readable medium having encoded thereon statements and instructions to cause a processor to:
obtain first electrocardiogram data, wherein the first electrocardiogram data is captured in a rest or relax condition or a motion or stress condition;
determine, by a discriminative network of generative adversarial networks, whether the first electrocardiogram data is captured in the rest or relax condition or the motion or stress condition;
generate, in response to a determination that the first electrocardiogram data is captured in the motion or stress condition, second electrocardiogram data by inputting the first electrocardiogram data to a generative network of the generative adversarial networks;
obtain a matching result by inputting (i) the first electrocardiogram data, in response to a determination that the first electrocardiogram data is captured in the rest or relax condition, or (ii) the second electrocardiogram data, in response to a determination that the first electrocardiogram data is captured in the motion or stress condition, to a matching network; and
determine a recognition result based on the matching result.

* * * * *

UNITED STATES PATENT AND TRADEMARK OFFICE
CERTIFICATE OF CORRECTION

PATENT NO. : 11,641,352 B2
APPLICATION NO. : 16/645000
DATED : May 2, 2023
INVENTOR(S) : Yazhao Li Page 1 of 1

It is certified that error appears in the above-identified patent and that said Letters Patent is hereby corrected as shown below:

In the Claims

In Column 14, Line 53, Claim 1, delete "tithe" and insert -- (i) the --, therefor.

In Column 14, Line 56, Claim 1, delete "iii)" and insert -- (ii) --, therefor.

In Column 15, Line 17, Claim 5, delete "apparatus to;" and insert -- apparatus to: --, therefor.

In Column 15, Line 32, Claim 5, delete "tithe" and insert -- (i) the --, therefor.

In Column 15, Line 35, Claim 5, delete "iii)" and insert -- (ii) --, therefor.

Signed and Sealed this
Twenty-ninth Day of August, 2023

Katherine Kelly Vidal
*Director of the United States Patent and Trademark Office*